United States Patent

[11] 3,566,948

[72] Inventors Hans Menell
Ahlem;
Johannes Kosanke, Letter, Germany
[21] Appl. No. 803,343
[22] Filed Feb. 28, 1969
[45] Patented Mar. 2, 1971
[73] Assignee Continental Gummi-Werke Aktiengesellschaft
Hannover, Germany
[32] Priority Mar. 1, 1968
[33] Germany
[31] C17,204

[54] STUDDED VEHICLE TIRE
6 Claims, 2 Drawing Figs.

[52] U.S. Cl. .................................................. 152/210
[51] Int. Cl. ............................................... B60c 11/16
[50] Field of Search........................................... 152/210

[56] References Cited
UNITED STATES PATENTS
| | | | |
|---|---|---|---|
| 2,904,093 | 9/1959 | Kroon .......................... | 152/210 |
| 3,334,678 | 8/1967 | Hakka.......................... | 152/210 |

*Primary Examiner*—James B. Marbert
*Attorney*—Walter Becker

ABSTRACT: A pneumatic vehicle tire having a tread strip and a plurality of groups of skid protective studs of hard metal respectively arranged in said tread strip along different circumferential zones and protruding outwardly from said tread strip, said circumferential zones when viewing the tire in transverse direction thereof being located one behind the other, the wear resistance of the studs of at least one group being different from the wear resistance of the studs of at least another one of said groups.

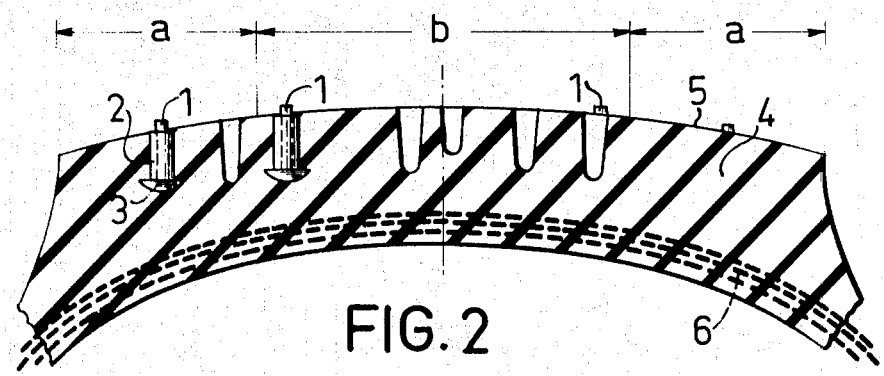
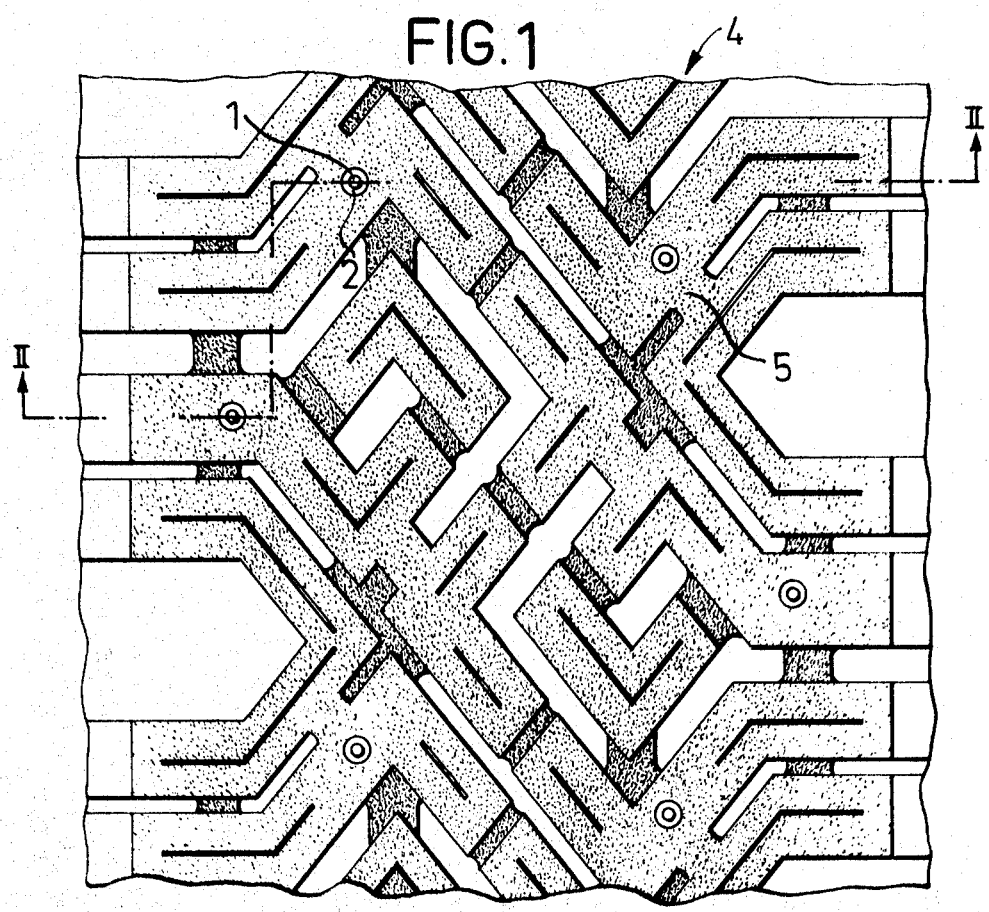

STUDDED VEHICLE TIRE

The present invention relates to vehicle tires provided with studs of hard metal. In order to obtain a maximum efficiency of the studs, the studs are distributed over the circumference and the width of the tread strip.

The present invention is based on the finding that when operating a tire, seen in the transverse direction of the tire, tread strip areas located one behind the other are subjected to different loads. In this connection there exists the danger that when arranging antiskid studs in tread strip areas of different loads, after a certain time of operation of the tire some of the studs will in view of the natural wear of the tread strip protrude from the latter to a greater extent than the other studs located in tread strip areas under different load. This applies particularly to the studs located in the central area of the tread strip and also to the studs located in the shoulder areas of the tread strip. The studs arranged in the central area of the tread strip surface will after a certain period of operation protrude from the tread strip to a greater extent than the studs provided in the shoulder areas. This results in the danger that the studs located in the central area of the tread strip will become loose and might under extreme conditions damage the carcass, whereas the studs located in the shoulder areas may protrude beyond the tread strip in an insufficient manner and thus may lose their effect.

It is, therefore, an object of the present invention to overcome the above mentioned drawbacks.

It is a further object of this invention to provide a studded tire in which the firm anchoring of the studs will not be endangered so that the effect of the studs will be maintained.

This object and other objects and advantages of the invention will appear more clearly from the following specification in connection with the accompanying drawing, in which:

FIG. 1 is a partial top view of a pneumatic vehicle tire suitable for winter weather.

FIG. 2 is a radial partial section through the tread strip zone of the tire shown in FIG. 1.

The pneumatic vehicle tire with studs located in the tread strip is characterized according to the present invention in that a plurality of studs have a wear resistance which is greater than the wear resistance of the remaining studs, while the studs with different wear resistance are arranged in tread strip zones which when viewing the tire in the transverse direction thereof are located one behind the other.

In this way the wear of the studs will be in conformity with the load acting on the tire, or expressed differently in conformity with the wear of the tread strip of the tire. The antiskid bodies formed by the studs are worn in conformity with the tread strip areas directly surrounding the same so that all the studs will even after a longer period of running of the tire protrude from the tread strip substantially uniformly and thus will not be loosened. It will be appreciated that such loosening will occur when the studs are not worn to substantially the same extent as the adjacent tread strip sections of the tire.

Referring now to the drawing in detail, the studs 1 may be of hard metal as is customary with studs on the market for this purpose and are firmly located and arranged in a sleeve 2 of softer metal or the like, said sleeves having their lower ends widened in a mushroom-shaped manner. This widening is designated with the reference numeral 3.

The tread strip 4 of the pneumatic vehicle tire which is primarily intended for winter weather will during the manufacturing process be provided with radially extending blind holes (not particularly shown in the drawing) into which the studs 1 are driven together with the sleeves 2 and the widened portions 3. In this way a firm anchoring of the studs in the tread strip 4 will be obtained.

According to FIG. 2, three zones are provided for the running surface 5 of the tread strip 4 and, more specifically, the two marginal or shoulder zones $a$ and the central zone $b$. The wear of the tread strip 4 is greater in the central zone $b$ than in the two shoulder zones $a$. It is for this reason that in the central zone $b$ of the pneumatic vehicle tire a greater wear occurs. Furthermore, the wall thickness of the rubber in the area of the central zone $b$ above the carcass 6 is less than the wall thickness of the rubber above the carcass 6 in the shoulder areas $a$.

The antiskid bodies with the antiskid studs 1 are distributed over the circumference of the tire in a plurality of circumferential rows and, more specifically, in such a way that studs are located in the shoulder areas $a$ as well as in the central area $b$.

In conformity with the present invention, the studs 1 of the shoulder areas $a$ are made of a hard metal which has a greater wear resistance than the material selected for the studs 1 in the central area $b$. If the antiskid bodies are driven into a new pneumatic tire, the studs 1 protrude beyond the tread surface 5 by from 0.7 to 1.7 millimeters. When the tire is operated, the studs 1 in the central area $b$ are subjected to a wear which corresponds to the increased wear in this area of the tread surface, whereas those studs 1 which have a higher wear resistance and are located in the shoulder areas $a$ are not worn to a greater extent but will even after a longer period of operation protrude from the tread surface to the prescribed extent.

The antiskid studs within the area $a$ preferably have a Vickers hardness of from 1300 to 1400, whereas the antiskid studs 1 within the tread strip area $b$ have preferably a Vickers hardness of from 1200 to 1300. The difference in the hardness measured in HV 20 (Vickers) for the tread strip surface areas $a$ and $b$ should always be approximately from 80 to 120.

The different wear resistances of the studs 1 may also be realized by different alloys or granular sizes of the hard metal.

According to the embodiment illustrated in the drawing, the studs 1 have within the areas $a$ and $b$ the same or practically the same cross section. In conformity with the present invention, however, it is also possible to bring about the respective wear resistance not only by the selection of different materials or alloys but by varying the cross section of the studs. Accordingly, the studs 1 within the area $a$ of the tread surface may have a larger cross section than the studs which are arranged in the adjacent tread strip surface zones. If desired, simultaneously different cross sections and different materials may be employed for the different studs, even though for reasons of a simpler manufacturing process such studs are to be preferred which with practically the same cross section differ from each other merely in the material or their wear resistance.

It is, of course, to be understood that the present invention is, by no means, limited to the particular showing in the drawing but also comprises modifications within the scope of the appended claims.

While various hard metals may be used as material for the studs, materials such as sintered metal carbide, and alloys such as WC-Co-hard metal have proved highly successful. As material for the sleeve 2 there may be used steel.

If different wear resistance of the studs is to be obtained contents of cobalt or the granular size of carbide may be varied in case of using WC-Co-hard metal.

We claim:

1. A pneumatic vehicle tire having a tread strip and a plurality of groups of skid protective studs of hard metal respectively arranged in said tread strip along different circumferential zones and protruding outwardly from said tread strip, said circumferential zones when viewing the tire in transverse direction thereof being located one behind the other, the improvement therewith comprising the wear resistance of the studs of at least one group being different characteristically from the wear resistance of the studs of at least another one of said groups.

2. An improvement in a tire according to claim 1, which includes groups of skid protective studs near the marginal tread strip areas and also includes at least one group of skid protective studs transversely between the groups of studs near the marginal tread strip areas, the studs of the groups near said marginal areas having more wear resistance than the studs between said last mentioned groups.

3. An improvement in a tire according to claim 2, in which the studs of the greater wear resistance have a Vickers hardness of from 1300 to 1400 particularly whereas the studs of less wear resistance have a Vickers hardness of from 1200 to 1300.

4. An improvement in a tire according to claim 2, in which the difference in hardness between the studs of greater and lower wear resistance amounts to from 80 to 120 Vickers units.

5. An improvement in a tire according to claim 1, in which the studs of different wear resistant material always have approximately the same diameter.

6. An improvement in a tire according to claim 1, in which the studs of one group differ in transverse cross section from the studs of an adjacent group of studs.